US012695836B2

(12) United States Patent
Okamoto et al.

(10) Patent No.: US 12,695,836 B2
(45) Date of Patent: Jul. 28, 2026

(54) IMAGE SCANNER

(71) Applicant: BROTHER KOGYO KABUSHIKI KAISHA, Nagoya (JP)

(72) Inventors: Yoshihiro Okamoto, Komaki (JP); Yuichiro Ichinose, Kariya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 344 days.

(21) Appl. No.: 18/592,692

(22) Filed: Mar. 1, 2024

(65) Prior Publication Data

US 2024/0323286 A1 Sep. 26, 2024

(30) Foreign Application Priority Data

Mar. 23, 2023 (JP) ................................. 2023-046192

(51) Int. Cl.
*G06F 15/00* (2006.01)
*H04N 1/00* (2006.01)
*H04N 1/04* (2006.01)
*H04N 1/12* (2006.01)

(52) U.S. Cl.
CPC ..... *H04N 1/00525* (2013.01); *H04N 1/00559* (2013.01); *H04N 1/0464* (2013.01); *H04N 1/1215* (2013.01); *H04N 1/1225* (2013.01); *H04N 1/123* (2013.01); *H04N 2201/0428* (2013.01)

(58) Field of Classification Search
None
See application file for complete search history.

(56) References Cited

U.S. PATENT DOCUMENTS

2003/0231360 A1* 12/2003 Jo ........................... H04N 1/125
358/514
2005/0001371 A1 1/2005 Otsuki
2019/0068815 A1 2/2019 Andoh et al.

FOREIGN PATENT DOCUMENTS

| JP | 2001-80771 A | 3/2001 |
| JP | 2003-81468 A | 3/2003 |
| JP | 2004-338905 A | 12/2004 |
| JP | 2009-249177 A | 10/2009 |
| JP | 2009-258360 A | 11/2009 |
| JP | 2009-260477 A | 11/2009 |
| JP | 2010-41561 A | 2/2010 |
| JP | 2019-41158 A | 3/2019 |

* cited by examiner

*Primary Examiner* — Mark R Milia
(74) *Attorney, Agent, or Firm* — Merchant & Gould P.C.

(57) ABSTRACT

A first reading sensor reads a first surface of a document. A second reading sensor reads a second surface of the document. An elastic body presses the second reading sensor toward the document that is conveyed toward an other side in a first direction. A conveyance guide includes a protrusion accommodating the elastic body. A friction pad contacts, from below, the document supported by a document placement surface. A recess is recessed downward from the document placement surface. A feed roller at a lowermost position enters the recess. An opening is formed in the document placement surface. The opening allows an exposed surface of the protrusion to be exposed to a side to which the document placement surface faces. The friction pad, the recess, and the opening are arranged away from one another in a second direction perpendicular to the first direction and an upper-lower direction.

16 Claims, 8 Drawing Sheets

UPPER

REAR

LEFT ← → RIGHT

FRONT

LOWER

UPPER

LEFT ←→ RIGHT

LOWER

UPPER

LEFT ←→ RIGHT

LOWER

IMAGE SCANNER

REFERENCE TO RELATED APPLICATIONS

This application claims priority from Japanese Patent Application No. 2023-046192 filed on Mar. 23, 2023. The entire content of the priority application is incorporated herein by reference.

BACKGROUND ART

An image scanner including a document tray and configured to read an image on a document is known.

SUMMARY

For example, an image scanner includes a document tray, a document conveyance path, a pickup roller, a pickup holder, first and second conveyance rollers, an image reading portion, and a back side image reading module.

The document conveyance path guides a document sheet from the document tray toward one side in a first direction (a sheet feed direction), then makes the document sheet make a U-turn downward, and further guides the document sheet toward the other side in the first direction (a direction opposite to the sheet feed direction).

The pickup roller feeds the document sheet from the document tray to the document conveyance path. The pickup holder is swingable about a feed roller axis at a position spaced apart from the pickup roller in one side of the first direction, and rotatably supports the pickup roller.

The first and second conveyance rollers convey the document sheet fed by the pickup roller along the document conveyance path. The image reading portion in a stop reading area reads an image on a surface of the document sheet facing downward, the document sheet being conveyed toward the other side in the first direction by the first and second conveyance rollers. The back side image reading module is disposed at a position separated from the image reading portion to the other side in the first direction, and reads an image on a surface facing upward of the document sheet that has passed the image reading portion.

In the above-described image scanner, the number of components disposed on the U-turn side in the document conveyance path is reduced due to the arrangement configuration of the back surface image reading module described above, thereby realizing reduction in size in the first direction.

However, in this image scanner, the pickup roller, the back side image reading module, a pressing portion that presses the back side image reading module against the document, and a friction member for suppressing multiple feeding of the lowermost document sheet placed on the document tray are likely to be arranged in an upper-lower direction, and thus there is a problem that it is difficult to reduce the size in the upper-lower direction.

In view of the foregoing, an example of an object of this disclosure is to provide an image scanner that realizes reduction in size in an upper-lower direction and a sheet feed direction.

According to one aspect, this specification discloses an image scanner. The image scanner includes a document placement surface, a conveyance guide, a feed roller, a holder arm, a conveyance roller, a first reading sensor, a second reading sensor, a plurality of elastic bodies, a chute, and a friction pad. The conveyance guide is configured to guide a document from the document placement surface toward one side in a first direction, then cause the document to make a U-turn downward, and further guide the document toward an other side in the first direction. The feed roller is configured to feed the document from the document placement surface to the conveyance guide. The holder arm is swingable about a swing axis located away from the feed roller toward the one side in the first direction. The swing axis extends in a second direction perpendicular to the first direction and an upper-lower direction. The holder arm rotatably supports the feed roller. The conveyance roller is configured to convey the document fed by the feed roller along the conveyance guide. The first reading sensor is configured to read a first surface of the document conveyed by the conveyance roller toward the other side in the first direction, the first surface being a surface facing downward. The second reading sensor is disposed away from the first reading sensor toward the other side in the first direction. The second reading sensor is configured to read a second surface of the document that has passed the first reading sensor, the second surface being a surface facing upward. The plurality of elastic bodies are located above the second reading sensor. The plurality of elastic bodies are configured to press the second reading sensor toward the document that is conveyed toward the other side in the first direction. The chute constitutes a part of the conveyance guide. The chute integrally includes a container portion and a plurality of protrusions. The container portion accommodates the second reading sensor and a lower portion of each of the plurality of elastic bodies. The plurality of protrusions communicate with the container portion and protruding upward from the container portion. Each of the plurality of protrusions accommodates an upper portion of a corresponding one of the plurality of elastic bodies. Each of the plurality of protrusions has an exposed surface. The friction pad is configured to contact, from below, the document supported by the document placement surface. Thus, the friction pad suppresses double feeding of the lowermost document placed on the document placement surface. A recess is formed to be recessed downward from the document placement surface. The feed roller is configured to enter the recess. Thus, the recess contributes to reduction of the size in the upper-lower direction by an amount that the feed roller located at the lower limit position enters the recess. A plurality of openings are formed in the document placement surface. The plurality of openings are configured to receive respective ones of the plurality of protrusions. Each of the plurality of openings allows the exposed surface of a corresponding one of the plurality of protrusions to be exposed to a side to which the document placement surface faces. Thus, the plurality of openings contribute to reduction of the size in the upper-lower direction. The exposed surface is a surface facing upward. The friction pad, the recess, and each of the plurality of openings are arranged away from one another in the second direction. Thus, reduction of the size in the upper-lower direction is realized. The friction pad and the recess are located downstream of a first edge of the exposed surface in a feed direction and located upstream of a second edge of the exposed surface in the feed direction when viewed in the second direction. The first edge is an upstream edge of the exposed surface in the feed direction. The second edge is a downstream edge of the exposed surface in the feed direction. The feed direction is a direction in which the feed roller feeds the document toward the one side in the first direction. Thus, reduction of the size in the first direction is realized. Thus, the image scanner of this aspect achieves reduction of the size in the upper-lower direction and the first direction.

According to another aspect, this specification also discloses an image scanner. The image scanner includes a document placement surface, a conveyance guide, a feed roller, a first reading sensor, a second reading sensor, an elastic body, and a friction pad. The conveyance guide is configured to guide a document from the document placement surface toward one side in a first direction, then cause the document to make a U-turn downward, and further guide the document toward an other side in the first direction. The feed roller is configured to feed the document from the document placement surface to the conveyance guide. The feed roller is movable between an uppermost position and a lowermost position. The first reading sensor is configured to read a first surface of the document conveyed toward the other side in the first direction, the first surface being a surface facing downward. The second reading sensor is configured to read a second surface of the document that has passed the first reading sensor, the second surface being a surface facing upward. The elastic body is configured to press the second reading sensor toward the document that is conveyed toward the other side in the first direction. The conveyance guide includes a protrusion accommodating the elastic body. The protrusion includes an exposed surface facing upward. The friction pad is configured to contact, from below, the document supported by the document placement surface. A recess is formed to be recessed downward from the document placement surface. The feed roller at the lowermost position is configured to enter the recess. An opening is formed in the document placement surface. The opening allows the exposed surface of the protrusion to be exposed to a side to which the document placement surface faces. The friction pad, the recess, and the opening are arranged away from one another in a second direction perpendicular to the first direction and an upper-lower direction. Each of the friction pad and the recess overlaps at least part of the exposed surface when viewed in the second direction.

DESCRIPTION

Hereinafter, first and second embodiments of the present disclosure will be described with reference to the drawings.

Figure 1:
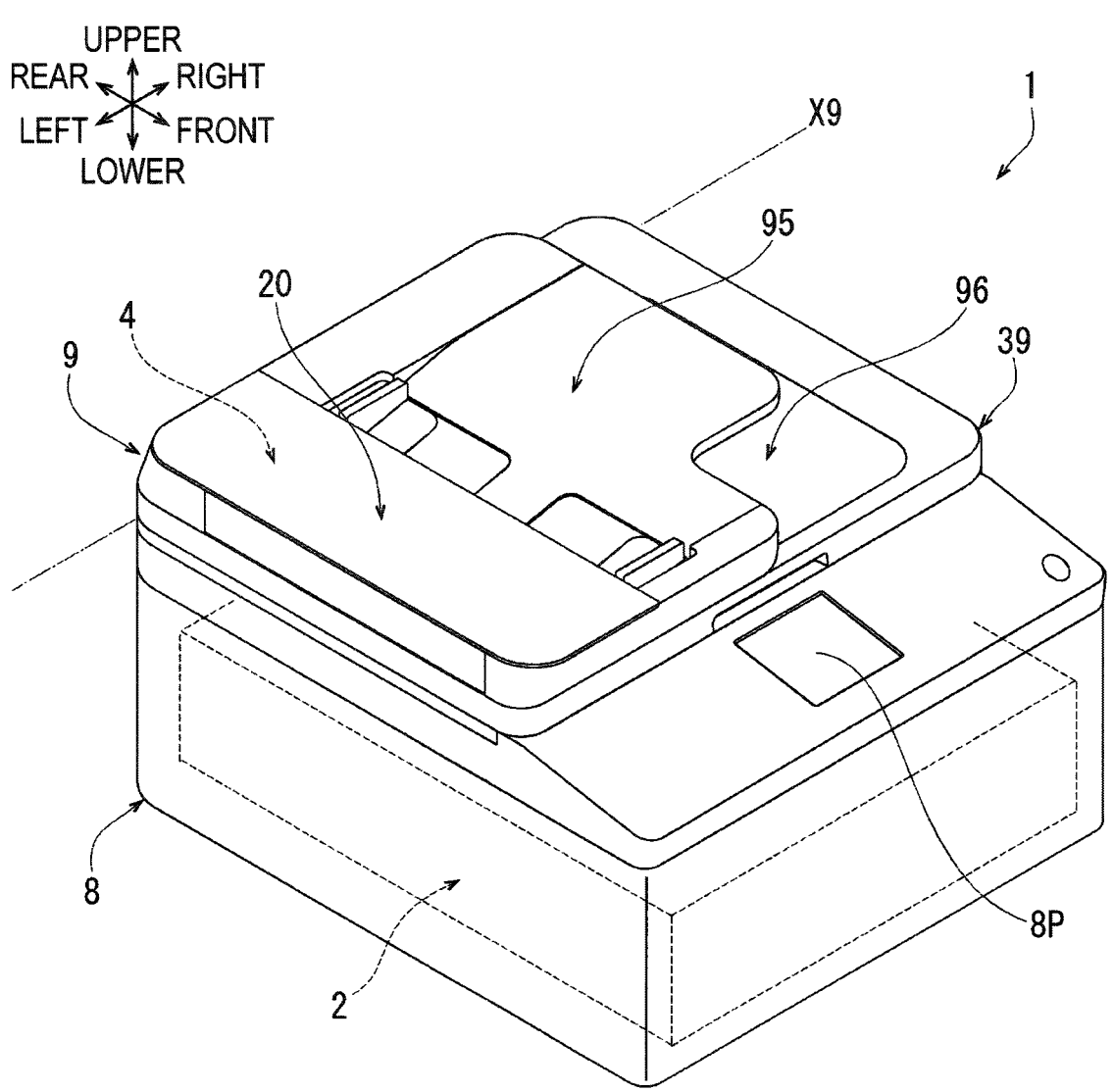
FIG. 1 is a perspective view of an image scanner.

FIG. 1 shows an image scanner (image reading apparatus) 1 according to a first embodiment of the present disclosure.

In FIG. 1, an operation panel 8P side of the image scanner 1 is the front side. The left side is the left side when facing the operation panel 8P. The front-rear direction, left-right direction, and upper-lower direction (vertical direction) shown in FIG. 2 and thereafter are all shown in the same manner as each direction shown in FIG. 1.

As shown in FIG. 1, the image scanner 1 includes a main body 8 and a document cover 9.

<Main Body>

The main body 8 is a flat, substantially box-shaped body. The operation panel 8P, such as a touch panel, is located on the front side of the main body 8. The main body 8 accommodates an image forming portion (print engine) 2 in its lower part. The image forming portion 2 forms an image on a sheet using an inkjet method, a laser method, and so on.

<Image Reading Portion>

Figure 2:
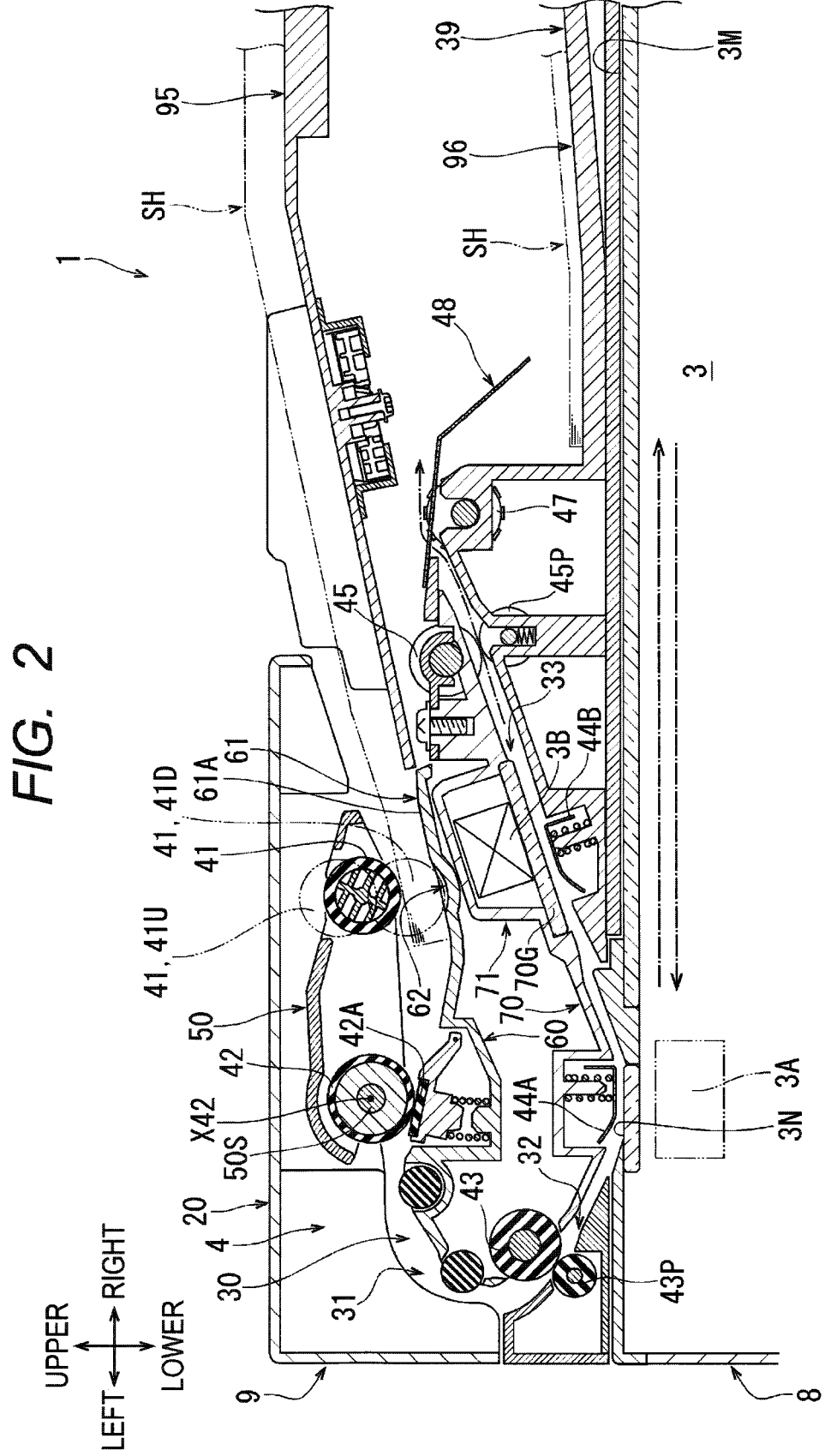
FIG. 2 is a schematic partial cross-sectional view of the image scanner.

As shown in FIG. 2, the main body 8 accommodates an image reading portion 3 in its upper part. The image reading portion 3 includes a document support surface 3M, a reading surface 3N, a first reading sensor 3A, and a scanning mechanism (not shown).

The document support surface 3M is the upper surface of a large platen glass located on the upper surface of the main body 8. The reading surface 3N is the upper surface of a platen glass that is located on the upper surface of the main body 8 to the left of the document support surface 3M and is elongated in the front-rear direction.

The document support surface 3M and the reading surface 3N are flat surfaces extending in the left-right direction and the front-rear direction, respectively. The left-right direction is an example of "first direction". The left side is an example of "one side in the first direction". The right side is an example of "other side in the first direction". The front-rear direction is an example of "second direction perpendicular to the first direction and upper-lower direction".

The document support surface 3M supports a document of an image reading (scanning) target. The document of the image reading target is a paper, a sheet such as an OHP sheet, a book, and so on. The reading surface 3N is used when a conveyor 4 described later operates, and a sheet-shaped document SH shown in FIG. 2 passes thereon.

The first reading sensor 3A is a well-known image reading sensor such as a contact image sensor (CIS) or a charge coupled device (CCD) and is elongated in the front-rear direction. The first reading sensor 3A is located below the document support surface 3M and the reading surface 3N.

When the image reading portion 3 reads the image of the document supported on the document support surface 3M, the first reading sensor 3A reads the image of the document in a line in the front-rear direction, that is, in a main scanning direction while moving rightward from a position below a left end of the document support surface 3M, that is, in a sub-scanning direction, by the operation of a scanning mechanism (not shown). When the first reading sensor 3A moves to a position below a right end of the document support surface 3M, the first reading sensor 3A finishes reading the image, and returns to a standby position by an operation of the scanning mechanism (not shown).

In a case where the conveyor 4 operates, the first reading sensor 3A moves to a stationary reading position below the reading surface 3N by an operation of the scanning mechanism (not shown) and stops.

<Document Cover>

As shown in FIG. 1, the document cover 9 is located above the main body 8. The rear end of the document cover 9 is coupled to the rear end of the main body 8 via a hinge (not shown). The document cover 9 is swingable about a swing axis X9 extending in the left-right direction.

As shown in FIG. 2, the document cover 9 has a base member 39 made of resin. The lower surface of the base member 39 forms the bottom surface of the document cover 9. The bottom surface of the document cover 9 has a size that covers the entire upper surface of the main body 8. The document cover 9 covers the document placed on the document support surface 3M with the lower surface of the base member 39.

Although not shown, when the user swings the document cover 9 upward and rearward about the swing axis X9, the document cover 9 opens the document support surface 3M. In this state, the user places a document on the document support surface 3M and takes out the document.

<Supply Tray and Discharge Tray>

As shown in FIGS. 1 and 2, the document cover 9 includes a supply tray 95 and a discharge tray 96. The supply tray 95 and the discharge tray 96 are located on the right part of the document cover 9.

The upper surface of the right part of the base member 39 forms the discharge tray 96. The supply tray 95 is located above the discharge tray 96. The supply tray 95 supports sheet-shaped documents SH of the image reading target in a stacked state. The discharge tray 96 supports the documents SH of which images have been read in a stacked state.

In the present embodiment, the document of which an image is read using the document support surface 3M and the document SH of which an image is read while being conveyed by the conveyor 4 may be substantially the same.

As shown in FIG. 2, the document cover 9 includes a lower chute member 70, an upper chute member 60, and a top cover 20, each of which is made of resin. The lower chute member 70 is an example of "chute".

The lower chute member 70 is located above the left part of the base member 39. The upper chute member 60 is located above the lower chute member 70. The top cover 20 is located above the upper chute member 60.

<Document Placement Portion>

Figure 3:
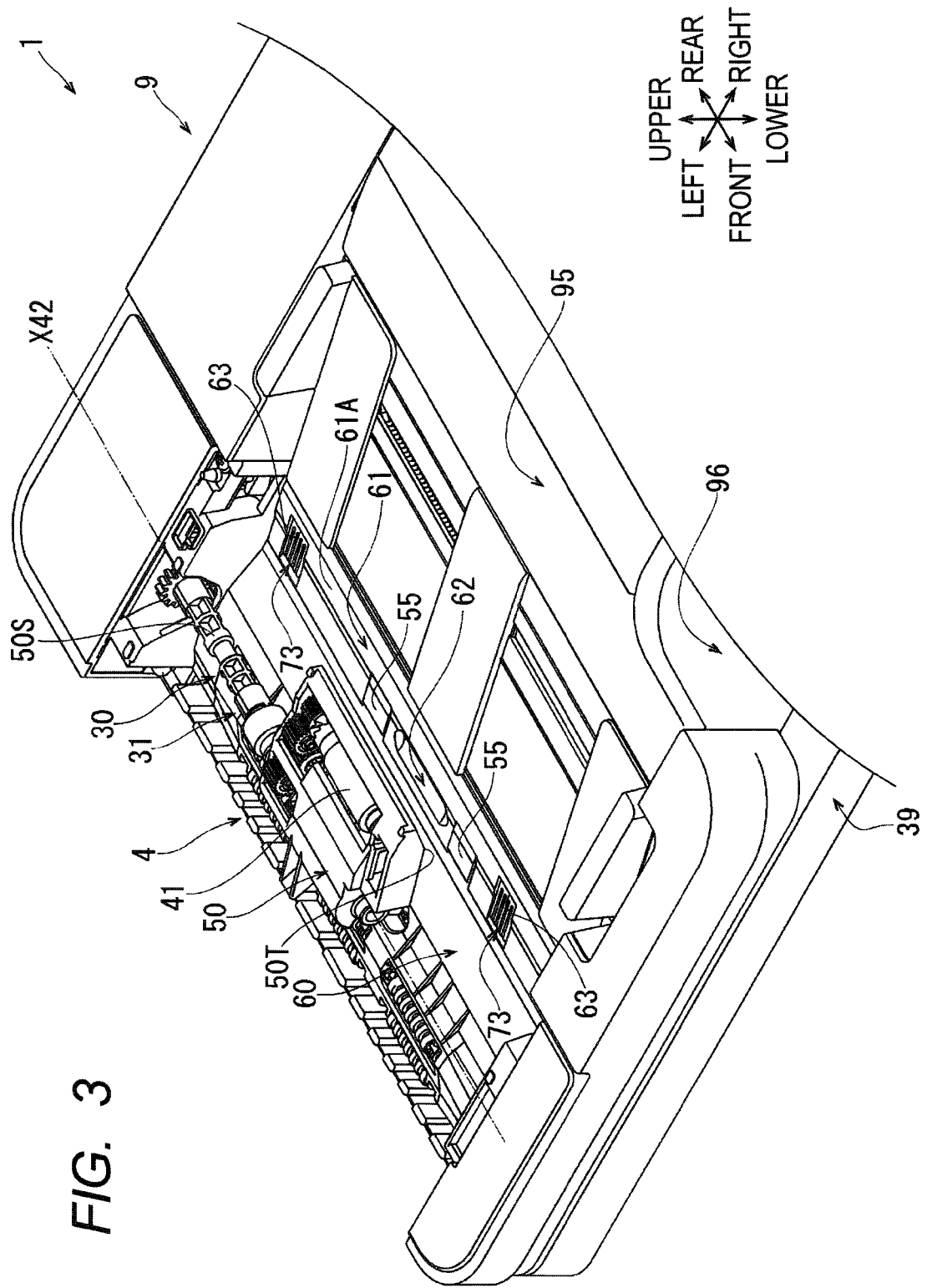
FIG. 3 is a partial perspective view showing a document cover in a state where a top cover is removed.

As shown in FIGS. 2 and 3, the document cover 9 has a document placement portion 61. The document placement portion 61 is the right part of the upper chute member 60 and is inclined gently downward to the left. The right end of the document placement portion 61 is adjacent to the left end of the supply tray 95 at a position covered by the top cover 20 from above.

When placing the document SH on the supply tray 95, the user inserts the document SH between the top cover 20 and the document placement portion 61. In this way, a portion of the document SH supported by the supply tray 95 that protrudes to the left from the left end of the supply tray 95 is placed on the document placement portion 61.

The upper surface of the document placement portion 61 is a placement surface (document placement surface) 61A that supports the document SH. The placement surface 61A extends leftward so as to be gently inclined downward, and extends in the front-rear direction.

<Conveyance Guide, Conveyor, and Second Reading Sensor>

As shown in FIG. 2, the document cover 9 includes a conveyance guide 30, a conveyor 4, and a second reading sensor 3B.

The conveyance guide 30 includes guide surfaces formed on the left part of the base member 39, the lower chute member 70, and the upper chute member 60, ribs protruding downward from a back side of the top cover 20, and so on.

The conveyance guide 30 includes a first conveyance guide 31, a second conveyance guide 32, and a third conveyance guide 33. The conveyance guide 30 guides the document SH from the document placement portion 61 to the left by means of the first conveyance guide 31, the second conveyance guide 32, and the third conveyance guide 33, then guides the document SH so as to make a U-turn downward, and then guides the document SH rightward, that is, toward the discharge tray 96. The lower chute member 70 constitutes a part of the second conveyance guide 32 and a part of the third conveyance guide 33.

The conveyor 4 includes a feed roller 41, a holder arm 50, a separation roller 42, a separation pad 42A, a conveyance roller 43, a conveyance pinch roller 43P, document pressers 44A and 44B, a discharge roller 45, a discharge pinch roller 45P, an auxiliary discharge roller 47, and an elastic piece 48.

As shown in FIGS. 2 and 3, the feed roller 41 faces the placement surface 61A of the document placement portion 61 from above.

The holder arm 50 is supported by a transmission shaft 50S extending along a swing axis X42 and is swingable about the swing axis X42. The swing axis X42 extends in the front-rear direction at a position separated leftward from the feed roller 41 and the document placement portion 61.

The holder arm 50 extends rightward of the transmission shaft 50S and rotatably supports the feed roller 41 at its right end side. Since the feed roller 41 contacts the uppermost document SH supported on the placement surface 61A of the document placement portion 61, the feed roller 41 swings about the swing axis X42 together with the holder arm 50 and moves in the upper-lower direction.

As shown in FIG. 2, the feed roller 41(41D) is in a state where the feed roller 41 has been moved to a lower limit position. The feed roller 41(41U) is in a state where the feed roller 41 has been moved to an upper limit position.

The separation roller 42 rotates about the swing axis X42 together with the transmission shaft 50S in a state of being surrounded by the holder arm 50 from the front, rear, and upper sides. The separation pad 42A is held by the upper chute member 60 at a position separated leftward from the feed roller 41 and the document placement portion 61 and is pressed toward the separation roller 42.

The conveyance roller 43 is located close to a left side wall of the document cover 9 and an upper surface of the main body 8. The conveyance pinch roller 43P is located on the left and lower sides of the conveyance roller 43 and is pressed toward the conveyance roller 43.

The document presser 44A is held by the lower chute member 70 and is located directly above the reading surface 3N. The document presser 44B is held by the base member 39 and is located at a position separated rightward from the document presser 44A.

The second reading sensor 3B is an image reading sensor similar to the first reading sensor 3A. The second reading sensor 3B is arranged at a position separated rightward from the first reading sensor 3A, and faces the document presser 44B from above. The second reading sensor 3B functions as a portion of the image reading portion 3 when the conveyor 4 operates.

The discharge roller 45 is located to be separated upward and leftward from the left end of the discharge tray 96. The discharge pinch roller 45P is located below the discharge roller 45 and is pressed toward the discharge roller 45.

The auxiliary discharge roller 47 is located at a position separated upward from the left end of the discharge tray 96 and at a position shifted leftward from the left end of the discharge tray 96. The upper end of the auxiliary discharge roller 47 is located above a nip position between the discharge roller 45 and the discharge pinch roller 45P.

The elastic piece 48 is made of a film of high rigidity. The elastic piece 48 protrudes rightward in a state of being cantilevered between the discharge roller 45 and the auxiliary discharge roller 47 and is bent at a position rightward of the auxiliary discharge roller 47 and is inclined downward to the right. The elastic piece 48 is disposed to be offset from the auxiliary discharge roller 47 in the front-rear direction.

The first conveyance guide 31 guides the document SH leftward from the supply tray 95 and the document placement portion 61, guides the document SH so as to make a U-turn downward, and guides the document SH to the conveyance roller 43 and the conveyance pinch roller 43P.

The second conveyance guide 32 guides the document SH from the conveyance roller 43 and the conveyance pinch roller 43P to the reading surface 3N in a downwardly inclined manner, and then guides the document SH so as to pass between the document presser 44A and the reading surface 3N, that is, above the first reading sensor 3A located at the stationary reading position.

The third conveyance guide 33 guides the document SH to be inclined upward to the right on the right side of the reading surface 3N, and then guides the document SH so as to pass between the document presser 44B and the second reading sensor 3B. The third conveyance guide 33 guides the document SH to the auxiliary discharge roller 47 and the elastic piece 48.

<Recess, Opening, Friction Member, and Adjacent Surface of Document Placement Portion>

Figure 4:
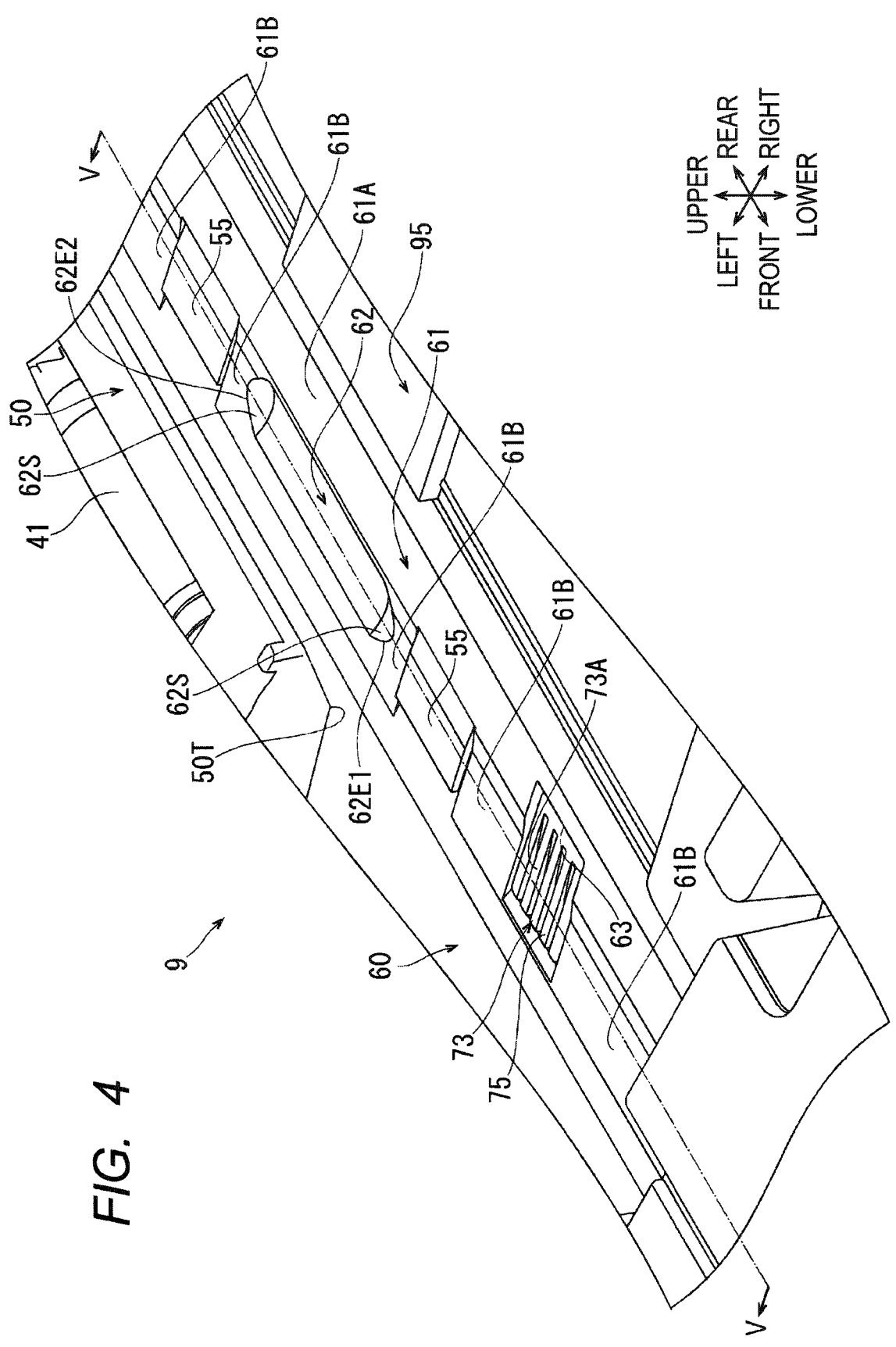
FIG. 4 is a partial enlarged perspective view showing relevant parts of FIG. 3.
Figure 5:
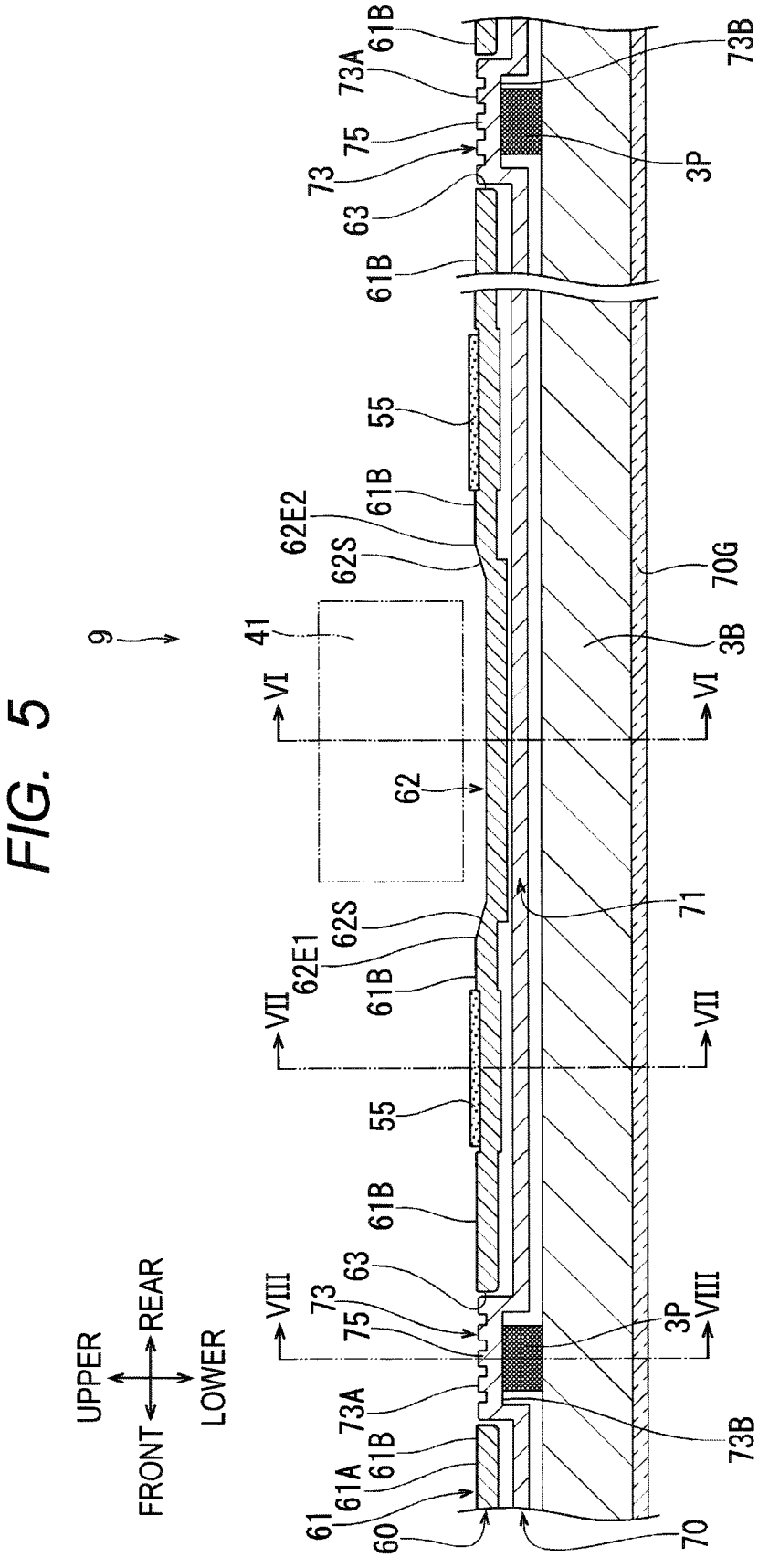
FIG. 5 is a partial cross-sectional view taken along a line V-V in FIG. 4.

As shown in FIGS. 3 to 5, the document placement portion 61 has one recess 62, two openings 63, and two friction members (friction pads) 55. The placement surface 61A of the document placement portion 61 has adjacent surfaces 61B.

Figures 6, 7:
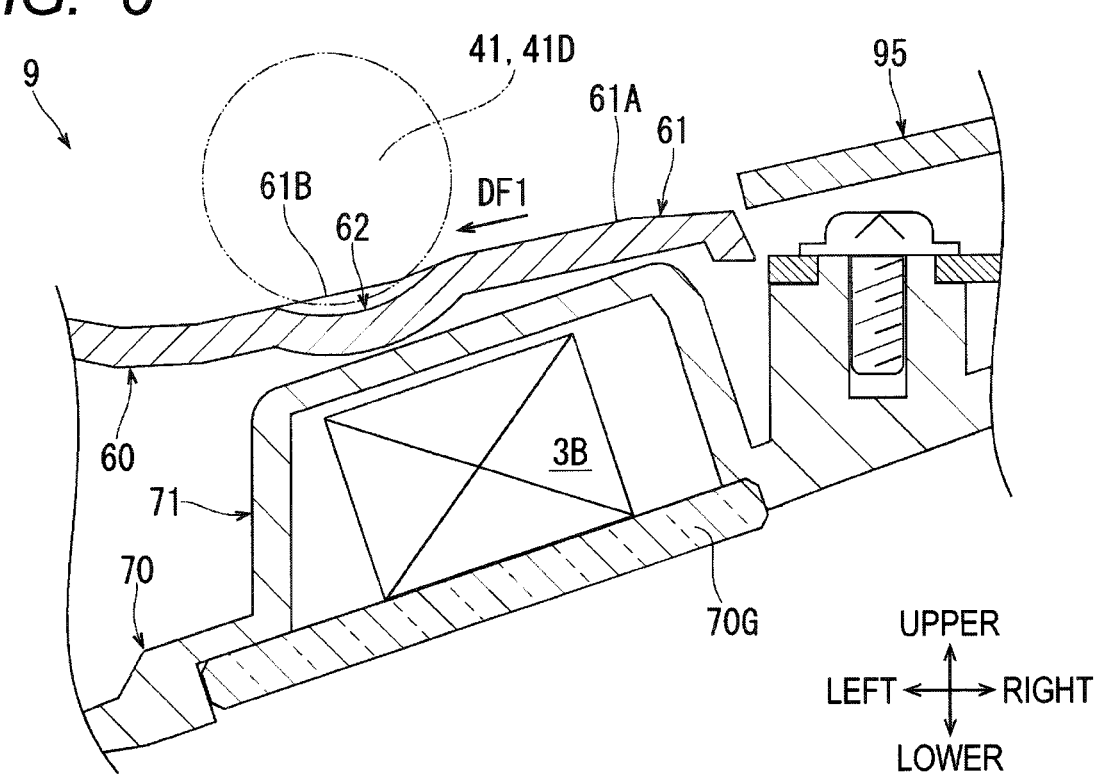
FIG. 6 is a partial cross-sectional view taken along a line VI-VI in FIG. 5.
FIG. 7 is a partial cross-sectional view taken along a line VII-VII in FIG. 5.

The recess 62 is located directly below the feed roller 41 and is recessed downward from the placement surface 61A. As shown in FIG. 6, a bottom surface of the recess 62 is curved to be an arc that matches a lower part of an outer circumferential surface of the feed roller 41 when viewed in cross-section. As shown in FIG. 5, the length of the bottom surface of the recess 62 in the front-rear direction is larger than the length of the feed roller 41 in the front-rear direction.

As shown in FIG. 3, the front opening 63 and the rear opening 63 differ only in position. For this reason, in FIG. 4, the illustration of the rear opening 63 is omitted.

As shown in FIGS. 3 to 5, the front opening 63 is arranged on the front side at a distance from the recess 62. The rear opening 63 is arranged on the rear side at a distance from the recess 62. Each opening 63 is a rectangular hole that penetrates the document placement portion 61 in the upper-lower direction.

Each friction member 55 is a plate made of a material having a high coefficient of friction against the document SH and is, for example, a corkboard. The front friction member 55 is located between the recess 62 and the front opening 63. The rear friction member 55 is located between the recess 62 and the rear opening 63. That is, the friction members 55 are arranged on the front and rear sides of the feed roller 41.

Each friction member 55, the recess 62, and each opening 63 are arranged away from one another in the front-rear direction.

As shown in FIGS. 4 to 8, the adjacent surfaces 61B are portions of the placement surface 61A and are surfaces that are aligned with the recess 62, each friction member 55, and each opening 63 in the front-rear direction. The adjacent surfaces 61B are also aligned with an exposed surface 73A described later in the front-rear direction.

As shown in FIGS. 4 and 5, each of a front end portion 62E1 and a rear end portion 62E2 of the recess 62 has an inclined surface 62S. The front end portion 62E1 and the rear end portion 62E2 of the recess 62 are an example of "both ends of the recess in the second direction".

Each inclined surface 62S is inclined upward toward the outer side in the front-rear direction and is connected to the adjacent surface 61B. Each inclined surface 62S is curved to match the curvature of the bottom surface of the recess 62.

As shown in FIGS. 3 and 7, the holder arm 50 has two convex portions 50T. The front convex portion 50T is formed at a lower edge of a front side wall of the holder arm 50 and protrudes downward. Although not shown, the rear convex portion 50T is formed at a lower edge of a rear side wall of the holder arm 50 and protrudes downward.

As shown in FIG. 7, in a state where no document SH is supported on the placement surface 61A, the holder arm 50 swings to lower the feed roller 41 and each convex portion 50T of the holder arm 50 contacts each friction member 55, whereby the lower limit position of the feed roller 41 is determined.

As shown in FIGS. 2 and 6, the feed roller 41 enters the recess 62. The feed roller 41(41D) at the lower limit position has entered the recess 62, but does not contact the bottom surface of the recess 62.

As shown in FIG. 7, a right end (an upstream end in a feed direction DF1) of the upper surface of each friction member 55 is located below the placement surface 61A, but the other portion is located above the adjacent surface 61B. The lower surface of each friction member 55 is located below the adjacent surface 61B. Each friction member 55 contacts the lowermost document SH supported by the placement surface 61A from below with its upper surface.

<Platen Glass, Container Portion, Protrusion, and Pressing Portion>

As shown in FIG. 2, the lower chute member 70 holds a platen glass 70G that constitutes a portion of the third conveyance guide 33 that faces the document presser 44B from above.

As shown in FIGS. 5 to 8, the second reading sensor 3B is located above the platen glass 70G, and its lower surface is in contact with the upper surface of the platen glass 70G.

Figure 8:
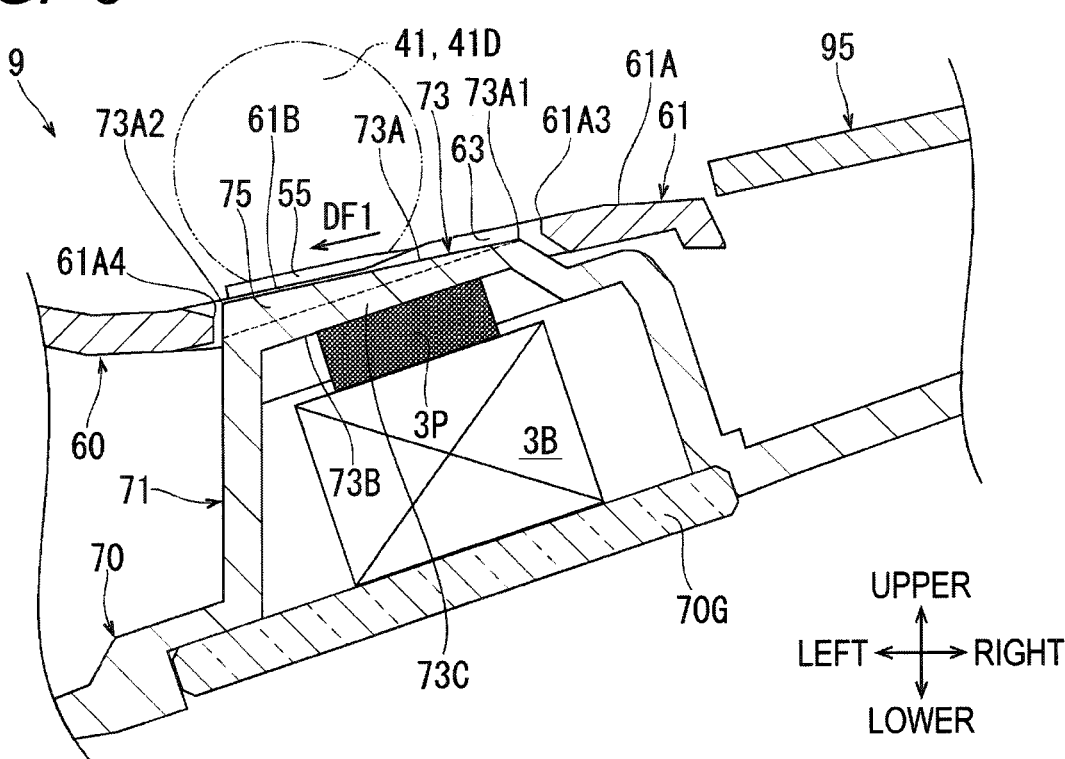
FIG. 8 is a partial cross-sectional view taken along a line VIII-VIII in FIG. 5.

As shown in FIGS. 5 and 8, the document cover 9 includes two pressing portions (elastic bodies) 3P. Each pressing portion 3P is located above the second reading sensor 3B in a state where the pressing portions 3P is compressed and deformed and stores restoring force. As each pressing portion 3P, a sponge, rubber, a compression coil spring, and so on having elastic deformability may be used. In the present embodiment, each pressing portion 3P is a substantially rectangular parallelepiped made of ethylene propylene diene rubber.

Each pressing portion 3P presses the second reading sensor 3B such that the lower surface of the second reading sensor 3B does not rise and separate from the upper surface of the platen glass 70G. In other words, each pressing portion 3P presses the second reading sensor 3B toward the document SH guided by the third conveyance guide 33 and conveyed rightward.

The lower chute member 70 is integrally formed with a container portion 71 shown in FIGS. 2, 5 to 8, and two protrusions 73 shown in FIGS. 3 to 5 and 9.

As shown in FIGS. 5 and 8, the container portion 71 is a substantially box-shaped body with an open bottom side, and the bottom side is closed by the platen glass 70G. The container portion 71 accommodates the second reading sensor 3B and a lower part of each pressing portion 3P.

As shown in FIG. 5, the front protrusion 73 is arranged on the front side of the feed roller 41. The rear protrusion 73 is arranged on the rear side of the feed roller 41.

The front protrusion 73 is disposed on the opposite side (that is, on the front side) of the feed roller 41 with respect to the front friction member 55 in the front-rear direction. The rear protrusion 73 is disposed on the opposite side (that is, on the rear side) of the feed roller 41 with respect to the rear friction member 55 in the front-rear direction.

As shown in FIGS. 5 and 8, each protrusion 73 is a substantially box-shaped body with an open bottom surface and is significantly smaller than the container portion 71. Each protrusion 73 is connected to the upper surface side of the container portion 71 and protrudes above the container portion 71. The internal space of each protrusion 73 communicates with the internal space of the container portion 71. Each protrusion 73 accommodates the upper portion of each pressing portion 3P.

Each protrusion 73 has the exposed surface 73A and a contact surface 73B. The exposed surface 73A is a surface of each protrusion 73 that faces upward. The exposed surface 73A is formed by the upper edge of a plurality of ribs 75 each extending in the left-right direction. The contact surface 73B is a surface of each protrusion 73 facing opposite to the exposed surface 73A. The contact surface 73B contacts the upper surface of the pressing portion 3P and maintains a state where the pressing portion 3P is compressed and deformed.

The front protrusion 73 enters the front opening 63. The rear protrusion 73 enters the rear opening 63. In other words, each opening 63 allows each protrusion 73 to enter in a one-to-one correspondence. Each opening 63 causes the exposed surface 73A of each protrusion 73 to be exposed on the placement surface 61A side.

A gap is formed between each protrusion 73 and a peripheral edge of each opening 63. This gap is set to a size that prevents each protrusion 73 from contacting the peripheral edge of each opening 63 even when the document placement portion 61 vibrates due to an operation of the conveyor 4.

Figure 9:
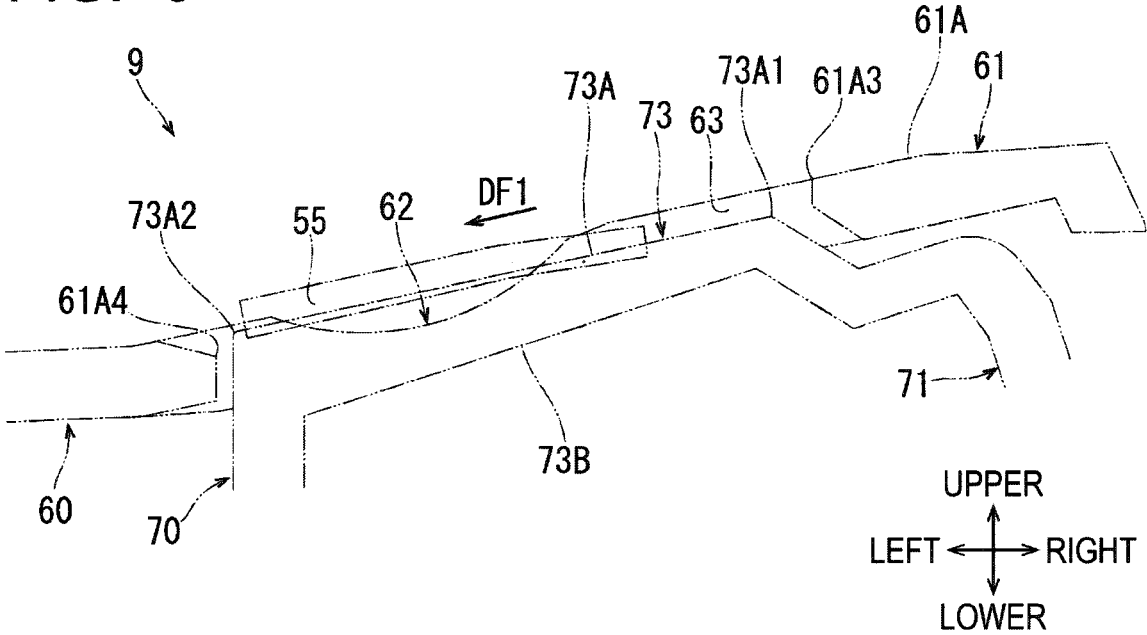
FIG. 9 is a schematic partial cross-sectional view for explaining a positional relationship between a friction member and a recess, and a first edge and a second edge of an exposed surface.

As shown in FIG. 9, the direction in which the feed roller 41 feeds the document SH leftward along the placement surface 61A is defined as the feed direction DF1.

The friction member 55 and the recess 62 indicated by a two-dot chain line in FIG. 9 indicates a projection plane of each of the friction member 55 and the recess 62 in the front-rear direction. The projection plane of each of the friction member 55 and the recess 62 in the front-rear direction overlaps a part of the protrusion 73 and overlaps a part of the exposed surface 73A. That is, each of the friction member 55 and the recess 62 overlaps a part of the protrusion 73 and overlaps a part of the exposed surface 73A, when viewed in the front-rear direction.

The edge of the exposed surface 73A located upstream in the feed direction DF1 is referred to as a first edge 73A1. The edge of the exposed surface 73A located downstream in the feed direction DF1 is referred to as a second edge 73A2.

Each friction member 55 and recess 62 are located downstream of the first edge 73A1 of the exposed surface 73A in the feed direction DF1 and upstream of the second edge 73A2 of the exposed surface 73A in the feed direction DF1 when viewed in the front-rear direction.

The edge of the placement surface 61A that defines each opening 63 upstream in the feed direction DF1 is referred to as a third edge 61A3. The edge of the placement surface 61A that defines each opening 63 downstream in the feed direction DF1 is referred to as a fourth edge 61A4.

The first edge 73A1 of the exposed surface 73A is located below the third edge 61A3 of the placement surface 61A. The second edge 73A2 of the exposed surface 73A is located above the fourth edge 61A4 of the placement surface 61A.

As shown in FIG. 8, the exposed surface 73A extends parallel to the adjacent surface 61B and is located one step lower than the adjacent surface 61B. The exposed surface 73A is configured to contact the document SH supported by the placement surface 61A.

<Image Reading Operation on Document Supported on Supply Tray>

When the image reading portion 3 reads the image of the document SH placed on the supply tray 95 and the document placement portion 61, the conveyor 4 operates, and the feed roller 41 feeds the document SH from the supply tray 95 and the document placement portion 61 to the first conveyance guide 31. The separation roller 42 and the separation pad 42A convey the document SH guided by the first conveyance guide 31 toward the conveyance roller 43 and the conveyance pinch roller 43P while separating the documents SH one sheet at a time.

Next, the conveyance roller 43 and the conveyance pinch roller 43P take over the document SH, convey the document SH guided by the first conveyance guide 31 and the second conveyance guide 32 rightward, cause the document SH to pass the reading surface 3N, and send the document SH to the third conveyance guide 33. At this time, the first reading sensor 3A located at the stationary reading position reads an image of the downward-facing side of the document SH passing the reading surface 3N.

Further, the conveyance roller 43 and the conveyance pinch roller 43P convey the document SH guided by the third conveyance guide 33 toward the second reading sensor 3B. When the image reading portion 3 reads images on both sides of the document SH, the second reading sensor 3B reads the image of the upward-facing side of the document SH that has passed the reading surface 3N and the first reading sensor 3A at the stationary reading position.

Thereafter, the discharge roller 45 and the discharge pinch roller 45P take over the document SH conveyed by the conveyance roller 43 and the conveyance pinch roller 43P and guided by the third conveyance guide 33, and discharge the document SH onto the discharge tray 96.

At this time, the auxiliary discharge roller 47 and the elastic piece 48 assist the discharge roller 45 and the discharge pinch roller 45P to discharge the document SH onto the discharge tray 96 from a position higher than the nip position of the discharge roller 45 and the discharge pinch roller 45P.

Each friction member 55 contacts the lowermost document SH placed on the document placement portion 61 from below, thereby suppressing double feeding of the lowermost document SH.

At this time, the lower end of the feed roller 41 descends below the upper surface of each friction member 55 and enters the recess 62, so that the lowermost document SH is curved and suitably pressed against each friction member 55. Thus, double feeding of the lowermost document SH is highly reliably suppressed.

In the image scanner 1 according to the first embodiment, each friction member 55 shown in FIG. 7 suppresses double feeding of the lowermost document SH placed on the document placement portion 61. The recess 62 shown in FIG. 6 contributes to reduction of the size in the upper-lower direction by an amount that the feed roller 41 (41D) located at the lower limit position enters the recess 62. Each opening 63 shown in FIGS. 5 and 8 allows each protrusion 73 to enter in a one-to-one correspondence and causes the exposed surface 73A of each protrusion 73 to be exposed on the placement surface 61A side, thereby contributing to reduction of the size in the upper-lower direction.

As shown in FIG. 3, the friction members 55, the recess 62, and the openings 63 are arranged away from one another in the front-rear direction, thereby realizing reduction of the size in the upper-lower direction.

As shown in FIG. 9, in the image scanner 1, each friction member 55 and the recess 62 are located downstream of the first edge 73A1 of the exposed surface 73A in the feed direction DF1 and upstream of the second edge 73A2 of the exposed surface 73A in the feed direction DF1 when viewed in the front-rear direction. With this configuration, reduction of the size in the left-right direction is realized.

Thus, the image scanner 1 of the first embodiment achieves reduction of the size in the upper-lower and left-right directions.

In the image scanner 1 of this embodiment, the protrusions 73 enter the openings 63 in a one-to-one correspondence and the exposed surface 73A of each protrusion 73 is exposed on the placement surface 61A side. That is, the exposed surface 73A is exposed to a side to which the placement surface 61A faces. Here, another configuration is considered in which each protrusion 73 contacts the document placement portion 61 from below, in order to reduce the size in the upper-lower direction. In this configuration, vibrations from the feed roller 41, the document placement portion 61, and so on are likely to be transmitted to the second reading sensor 3B via each protrusion 73, and the image reading quality of the second reading sensor 3B may deteriorate. In the image scanner 1, each opening 63 contributes to suppressing vibrations from the feed roller 41, the document placement portion 61, and so on from being transmitted to the second reading sensor 3B via each protrusion 73. Thus, deterioration of the image reading quality of the second reading sensor 3B is suppressed.

As shown in FIG. 9, in the image scanner 1, the first edge 73A1 of the exposed surface 73A is located below the third edge 61A3 of the placement surface 61A, and the second edge 73A2 of the exposed surface 73A is located above the fourth edge 61A4 of the placement surface 61A. With this configuration, when the user places the document SH on the document placement portion 61 or when the feed roller 41 feeds the document SH placed on the document placement portion 61, jamming of the document SH around the exposed surface 73A is suppressed.

As shown in FIG. 8, in the image scanner 1, the exposed surface 73A extends parallel to the adjacent surface 61B and is located one step lower than the adjacent surface 61B, and thus, the exposed surface 73A is configured to contact the document supported on the placement surface 61A. With this configuration, the exposed surface 73A supports the document SH in cooperation with the placement surface 61A. Thus, even if the document SH is deformed, jamming of the document SH around the exposed surface 73A is suppressed.

As shown in FIG. 3, in the image scanner 1, each protrusion 73 is arranged on the front and rear sides of the feed roller 41. With this configuration, each pressing portion 3P presses the second reading sensor 3B in a well-balanced manner with respect to the front-rear direction.

In the image scanner 1, two friction members 55 are arranged on the front and rear sides of the feed roller 41. The lower limit position of the feed roller 41 is determined by each convex portion 50T of the holder arm 50 contacting the corresponding friction member 55 in a state where no document SH is supported on the placement surface 61A. As shown in FIG. 6, the feed roller 41(41D) at the lower limit position enters the recess 62 but does not contact a bottom curved surface defining the recess 62. With this configuration, contact between the feed roller 41 and the recess 62 is reliably restricted in the vicinity of the feed roller 41 and the recess 62. For this reason, the feed roller 41 and the recess 62 do not contact each other in a state where no document SH is supported on the placement surface 61A, thereby suppressing problems such as a drive load being applied to a motor, wear of the feed roller 41, and generation of friction noise.

As shown in FIG. 3, in the image scanner 1, each protrusion 73 is disposed on the opposite side of the feed roller 41 with respect to the corresponding friction member 55 in the front-rear direction. With this configuration, a rotation shaft of the feed roller 41 is shortened, and each pressing portion 3P presses the second reading sensor 3B in a well-balanced manner with respect to the front-rear direction.

As shown in FIG. 9, in the image scanner 1, the projection plane of each of the friction member 55 and the recess 62 in the front-rear direction overlaps a part of the protrusion 73. With this configuration, further reduction of the size in the upper-lower direction is realized.

As shown in FIG. 5, in the image scanner 1, the exposed surface 73A is formed by a plurality of ribs 75 each extending in the left-right direction. More specifically, the exposed surface 73A is not parallel to a glass surface of the platen glass 70G. In order to press the second reading sensor 3B against the glass surface of the platen glass 70G, the contact surface 73B needs to be parallel to the glass surface of the platen glass 70G. If a wall having surfaces 73A and 73B is a solid wall without ribs, since the surfaces 73A and 73B are not parallel to each other, the thickness of the wall having surfaces 73A and 73B becomes ununiform, which may affect the quality at the time of resin molding. In the present embodiment, since the plurality of ribs 75 are provided to form the exposed surface 73A, the thickness of a wall 73C for forming the contact surface 73B is made uniform, and the contact surface 73B facing opposite to the exposed surface 73A and contacting the pressing portion 3P is made flat. As shown in FIG. 8, each rib 75 has an elongated triangular shape in cross section. In this way, the contact surface 73B suitably supports the pressing portion 3P.

As shown in FIG. 4, in the image scanner 1, each of the front end portion 62E1 and the rear end portion 62E2 of the recess 62 has the inclined surface 62S. With this configuration, an edge of connection between the adjacent surface 61B and the recess 62 is made small. Thus, if the number of documents SH supported on the placement surface 61A is reduced, damage to the document SH is suppressed.

As shown in FIG. 9, in the image scanner 1, the projection plane of each of the friction member 55 and the recess 62 in the front-rear direction overlaps a part of the exposed surface 73A. With this configuration, further reduction of the size in the upper-lower direction is realized.

Figure 10:
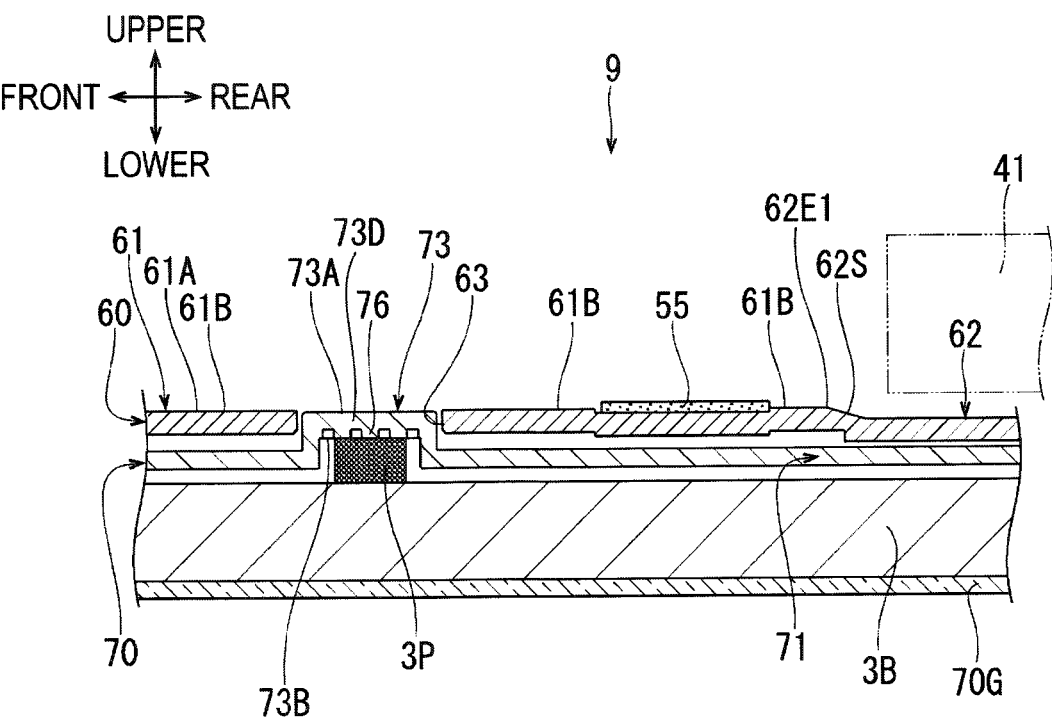
FIG. 10 is a partial cross-sectional view similar to FIG. 5, showing an image scanner.

As shown in FIG. 10, an image scanner of a second embodiment employs a plurality of ribs 76 each extending in the left-right direction on the pressing portion 3P side, instead of the plurality of ribs 75 of each protrusion 73 according to the image scanner 1 of the first embodiment. The exposed surface 73A of each protrusion 73 is a flat surface, and the contact surface 73B of each protrusion 73 is formed by the lower edge of each rib 76.

The other configurations of the second embodiment are the same as those of the first embodiment. Thus, the same reference numerals are given to the same components as those in the first embodiment, and the description thereof will be omitted.

The image scanner of the second embodiment having such a configuration realizes reduction of the size in the upper-lower direction and the left-right direction, similarly to the image scanner 1 of the first embodiment.

In the image scanner, by forming the contact surface 73B by the ribs 76, the exposed surface 73A is formed as a flat surface while the thickness of a wall 73D having the exposed surface 73A in each protrusion 73 is made uniform. Thus, the exposed surface 73A suitably supports the document SH in cooperation with the placement surface 61A.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Thus, the disclosure is intended to embrace all known or later developed alternatives, modifications, variations, improvements, and/or substantial equivalents. Some specific examples of potential alternatives, modifications, or variations in the described invention are provided below.

In the first and second embodiments, the document placement portion 61 is a part of the upper chute member 60 and is a member separate from the supply tray 95. However, the present disclosure is not limited to this configuration. For example, the present disclosure includes a configuration in which a document placement portion is a part of the supply tray.

In the first and second embodiments, in a state where no document SH is supported on the placement surface 61A, the lower limit position of the feed roller 41 is determined by the front and rear two convex portions 50T of the holder arm 50 contacting the front and rear two friction members 55. However, the present disclosure is not limited to this configuration. For example, the present disclosure includes a configuration in which one of the two convex portions 50T of the holder arm 50 is omitted.

The present disclosure may be applied to, for example, an image scanner, a multifunction peripheral (MFP) having an image forming function and an image reading function, and so on.

What is claimed is:

1. An image scanner comprising:
a document placement surface;
a conveyance guide configured to guide a document from the document placement surface toward one side in a first direction, then cause the document to make a U-turn downward, and further guide the document toward an other side in the first direction;
a feed roller configured to feed the document from the document placement surface to the conveyance guide;
a holder arm swingable about a swing axis located away from the feed roller toward the one side in the first direction, the swing axis extending in a second direction perpendicular to the first direction and an upper-lower direction, the holder arm rotatably supporting the feed roller;
a conveyance roller configured to convey the document fed by the feed roller along the conveyance guide;
a first reading sensor configured to read a first surface of the document conveyed by the conveyance roller toward the other side in the first direction, the first surface being a surface facing downward;
a second reading sensor disposed away from the first reading sensor toward the other side in the first direction, the second reading sensor being configured to read a second surface of the document that has passed the first reading sensor, the second surface being a surface facing upward;
a plurality of elastic bodies located above the second reading sensor, the plurality of elastic bodies being configured to press the second reading sensor toward the document that is conveyed toward the other side in the first direction;
a chute constituting a part of the conveyance guide, the chute integrally including a container portion and a plurality of protrusions, the container portion accommodating the second reading sensor and a lower portion of each of the plurality of elastic bodies, the plurality of protrusions communicating with the container portion and protruding upward from the container portion, each of the plurality of protrusions accommodating an upper portion of a corresponding one of the plurality of elastic bodies, each of the plurality of protrusions having an exposed surface; and
a friction pad configured to contact, from below, the document supported by the document placement surface,
a recess being formed to be recessed downward from the document placement surface, the feed roller being configured to enter the recess,
a plurality of openings being formed in the document placement surface, the plurality of openings being configured to receive respective ones of the plurality of protrusions, each of the plurality of openings allowing the exposed surface of a corresponding one of the plurality of protrusions to be exposed to a side to which the document placement surface faces, the exposed surface being a surface facing upward,
the friction pad, the recess, and each of the plurality of openings being arranged away from one another in the second direction,
the friction pad and the recess being located downstream of a first edge of the exposed surface in a feed direction and located upstream of a second edge of the exposed surface in the feed direction when viewed in the second direction, the first edge being an upstream edge of the exposed surface in the feed direction, the second edge being a downstream edge of the exposed surface in the feed direction, the feed direction being a direction in which the feed roller feeds the document toward the one side in the first direction.

2. The image scanner according to claim 1, wherein the first edge of the exposed surface is located below a third edge defining an upstream end of each of the plurality of openings in the document placement surface in the feed direction; and
wherein the second edge of the exposed surface is located above a fourth edge defining a downstream end of each of the plurality of openings in the document placement surface in the feed direction.

3. The image scanner according to claim 2, wherein the document placement surface includes an adjacent surface aligned with the recess and the exposed surface in the second direction; and wherein the exposed surface extending in parallel with the adjacent surface and located at one step below the adjacent surface, the exposed surface being configured to contact the document supported by the document placement surface.

4. The image scanner according to claim 1, wherein the plurality of protrusions are arranged on one side and an other side of the feed roller in the second direction.

5. The image scanner according to claim 1, wherein the friction pad includes a plurality of friction pads arranged on one side and an other side of the feed roller in the second direction;

wherein a lowermost position of the feed roller is determined by contact of the holder arm with the friction pad in a state where no document is supported by the document placement surface; and wherein the feed roller at the lowermost position enters the recess and does not contact a bottom surface defining the recess.

6. The image scanner according to claim 5, wherein each of the plurality of protrusions is located on an opposite side of the feed roller with respect to a corresponding one of the plurality of friction pads in the second direction.

7. The image scanner according to claim 1, wherein each of the friction pad and the recess overlaps at least part of the protrusion when viewed in the second direction.

8. The image scanner according to claim 1, wherein the exposed surface is formed by a plurality of ribs each extending in the first direction.

9. The image scanner according to claim 1, wherein each of the plurality of protrusions includes a contact surface facing opposite to the exposed surface, the contact surface being in contact with a corresponding one of the plurality of elastic bodies; and wherein the contact surface is formed by a plurality of ribs each extending in the first direction.

10. The image scanner according to claim 1, wherein the document placement surface includes an adjacent surface aligned with the recess and the exposed surface in the second direction; and wherein both ends of the recess in the second direction includes inclined surfaces that are inclined upward and outward in the second direction and connecting to the adjacent surface.

11. The image scanner according to claim 8, wherein each of the plurality of protrusions includes a wall having an upper side and a lower side, the plurality of ribs being provided on the upper side, the lower side being a contact surface in contact with a corresponding one of the plurality of elastic bodies, the wall having a uniform thickness.

12. The image scanner according to claim 1, wherein a gap is formed between each of the plurality of protrusions and a peripheral edge of a corresponding one of the plurality of openings.

13. The image scanner according to claim 12, wherein the gap is set to a size that prevents each of the plurality of protrusions from contacting the peripheral edge of the corresponding one of the plurality of openings when the document placement surface vibrates due to an operation of the feed roller or the conveyance roller.

14. An image scanner comprising:

a document placement surface;

a conveyance guide configured to guide a document from the document placement surface toward one side in a first direction, then cause the document to make a U-turn downward, and further guide the document toward an other side in the first direction;

a feed roller configured to feed the document from the document placement surface to the conveyance guide, the feed roller being movable between an uppermost position and a lowermost position;

a first reading sensor configured to read a first surface of the document conveyed toward the other side in the first direction, the first surface being a surface facing downward;

a second reading sensor configured to read a second surface of the document that has passed the first reading sensor, the second surface being a surface facing upward;

an elastic body configured to press the second reading sensor toward the document that is conveyed toward the other side in the first direction, the conveyance guide including a protrusion accommodating the elastic body, the protrusion including an exposed surface facing upward; and a friction pad configured to contact, from below, the document supported by the document placement surface, a recess being formed to be recessed downward from the document placement surface, the feed roller at the lowermost position being configured to enter the recess, an opening being formed in the document placement surface, the opening allowing the exposed surface of the protrusion to be exposed to a side to which the document placement surface faces, the friction pad, the recess, and the opening being arranged away from one another in a second direction perpendicular to the first direction and an upper-lower direction, each of the friction pad and the recess overlapping at least part of the exposed surface when viewed in the second direction.

15. The image scanner according to claim 14, wherein the protrusion includes a plurality of protrusions arranged on one side and an other side of the feed roller in the second direction.

16. The image scanner according to claim 15, wherein the friction pad includes a plurality of friction pads arranged on one side and an other side of the feed roller in the second direction; and wherein each of the plurality of protrusions is located on an opposite side of the feed roller with respect to a corresponding one of the plurality of friction pads in the second direction.

\* \* \* \* \*